United States Patent Office 3,458,639
Patented July 29, 1969

3,458,639
NITROPHENYL CARBAMIC ACID ESTERS
AS MOLLUSCICIDES
Rudolf Heiss, Cologne-Stammheim, and Ernst Grigat, Ernst Bocker, and Gunther Hermann, Leverkusen, Germany, assignors to Farbenfabriken Bayer Aktiengesellschaft, Leverkusen, Germany, a corporation of Germany
No Drawing. Original application Mar. 3, 1965, Ser. No. 436,916, now abandoned. Divided and this application Feb. 16, 1967, Ser. No. 632,852
Claims priority, application Germany, Mar. 5, 1964, F 42,211
Int. Cl. A01n 9/20; C07c 125/06
U.S. Cl. 424—300                                12 Claims

ABSTRACT OF THE DISCLOSURE

Methods of controlling molluscs by applying to the molluscs and/or their habitat a molluscicidally effective amount of a nitrophenyl carbamic acid ester having the formula

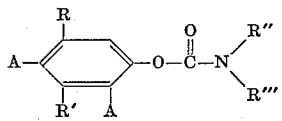

in which R is lower alkyl, R' and R''' each is hydrogen or lower alkyl, R'' is lower alkyl, halo-substituted lower alkyl, phenyl, or halo-substituted phenyl, and each A is hydrogen or nitro, at least one such A being nitro.

---

This is a divisional application of copending application Ser. No. 436,916, filed Mar. 3, 1965, now abandoned.

The present invention is concerned with new carbamic acid esters, and compositions containing the same, having a molluscicidal activity and with methods for the production and use thereof.

It is already known that some carbamic acid esters have a molluscicidal activity: 3,5-dimethyl-4-dimethyl-aminophenyl-N-methyl carbamate is regarded as particularly active (Arnold: Snail and lawn pest control with Zectran pesticide, Down to Earth, 18, No. 3, pp. 20–24).

It is an object of the present invention to provide particular carbamaic acid esters which exhibit highly effective molluscicidal properties.

It is another object of the present invention to provide processes for the production of such particular carbamic acid esters utilizing various starting materials whereby a versatile overall technique may be used to produce the particular carbamic acid esters of the foregoing type, depending upon the availability of various starting materials and the desirability of carrying out the production process by one particular route rather than another.

It is another object of the present invention to provide compositions containing such carbamic acid esters, which possess such activity, as well as methods for using such esters to combat mollusks.

It is still another object of the present invention to provide various processes for the production of such carbamic acid esters utilizing an extremely wide temperature range for such purpose in the presence or absence of solvents or reaction diluents.

It is a further object of the present invention to provide particular carbamic acid ester compounds which possess a low toxicity to warm blooded animals and fish yet which at the same time exhibit strong molluscicidal properties, for particular control of both land and water pulmonate gastropods.

It is still another object of the present invention to provide compositions or formulations of the aforesaid carbamic acid esters with carrier vehicles.

Other and further objects of the present invention will become apparent from a study of the within specification and accompanying examples.

It has now been found in accordance with the present invention that nitro phenyl carbamic acid esters of the general formula:

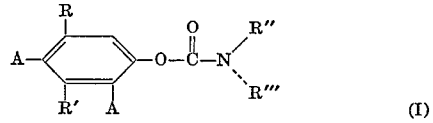

(I)

wherein R denotes a lower alkyl radical, R'' denotes a lower alkyl or aryl radical, optionally substituted by halogen, R' and R''', which may be the same or different, denote hydrogen atoms or lower alkyl radicals and A denotes a hydrogen atom or a nitro group, with the proviso that a nitro group is always present in the phenyl radical, exhibit strong molluscidal properties.

The nitro phenyl carbamic acid esters of general Formula I according to the present invention are obtained:
(a) when a phenol of the general formula:

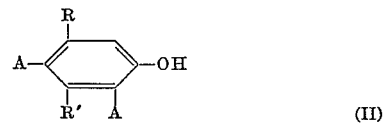

(II)

wherein R, R' and A have the foregoing meaning, is reacted with an isocyanate of the general formula

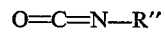

wherein R'' has the foregoing meaning; or (b) when a phenol of general Formula II is first converted with an excess of phosgene into the corresponding chloroformic acid ester and such chloroformic acid ester is then reacted with an alkylamine of the general formula:

(III)

wherein R'' and R''' have the foregoing meaning; or (c) when a phenol of general Formula II is first reacted with an approximately half molar quantity of phosgene to form the corresponding bis-(phenyl) carbonate and such bis-(phenyl) carbonate is then reacted with an alkylamine of general Formula III.

In the above-noted general Formula I, R preferably represents an alkyl radical containing 1 to 5 carbon atoms, R'' preferably represents an alkyl radical containing 1 to 5 carbon atoms or a phenyl radical, the radical R'' possibly being substituted by halogen, such as chlorine and/or or bromine, and R' and R''', which may be the same or different, preferably represent hydrogen atoms or alkyl radicals containing 1 to 5 carbon atoms.

It is surprising that the above defined carbamates according to the present invention exhibit a considerably higher molluscicidal activity, for instance, than the previously known N-methyl-1-naphthyl carbamate and 4-dimethylamino-3,5-xylyl-N-methyl carbamate, these being the chemically most closely related active agents having the same type of activity. Therefore, the compounds according to the present invention constitute a valuable addition to the art.

Method (a)

When 3,5-dimethyl-4-nitro-phenol and methyl isocyanate are used as starting materials for the instant process, the sequence of the reaction according to method (a) may be represented by the following equation:

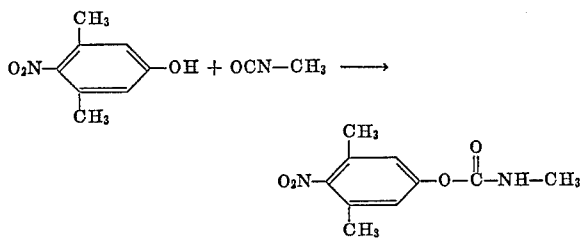

The reaction may be carried out in an inert solvent, if desired. Hydrocarbons, including aliphatic and aromatic hydrocarbons, such as benzine (petroleum fraction boiling at 70–90° C.) and benzene, toluene, xylene, mesitylene, etc., may, for example, be used for this purpose, as well as ethers, especially cyclic ethers, such as furan, dioxan, etc. It is, however, also possible to react the components directly in the absence of solvents. The reaction is accelerated by the addition of a tertiary amine, such as a trilower alkyl amine having 1–4 carbon atoms per alkyl chain, for example, triethylamine. The reaction temperatures may be varied within a fairly wide range. In general, the operation is carried out at a temperature substantially between about 0 and 150° C.

Method (b)

When 3,5-dimethyl-4-nitro-phenol and methylamine are used as starting materials, the sequence of the reaction during the second stage of method (b), i.e. after the condensation reaction between such phenol compound and phosgene in the first stage, can be represented by the following equation:

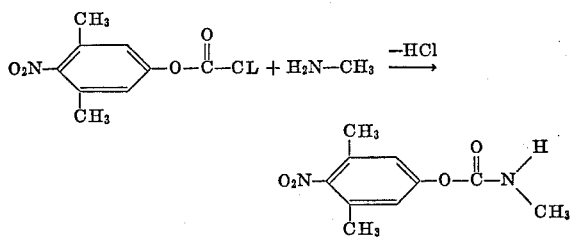

During the first stage, the nitrophenol is converted by an excess of phosgene into the corresponding chloroformic acid ester, conveniently if desired in the presence of inert solvents, such as aromatic hydrocarbons, i.e. benzene, toluene, xylene, mesitylene, etc. A base, conveniently an alkali metal hydroxide, e.g. sodium, potassium or lithium hydroxide, is continuously added dropwise in order to neutralize the hydrochloric acid formed. The pH value, however, should remain at 6–7. The reaction temperatures may be varied within a fairly wide range. In general, the operation is carried out at a temperature substantially between about −10 and +10° C.

During the second stage, the chloroformic acid ester is reacted with an approximately equivalent quantity of the amine. For this purpose, if desired, it is convenient to operate in the presence of inert solvents, such as aromatic and aliphatic hydrocarbons, such as benzene, toluene, xylene, mesitylene, etc., benzine, etc., as well as ethers, especially cyclic ethers such as furan, dioxan, etc. The reaction temperatures may again be varied within a certain range: in general, they are substantially between about −10 and +10° C.

Method (c)

When 3,5-dimethyl-4-nitro-phenol and methylamine are used as the starting materials, the sequence of the reaction during the second stage of method (c), i.e. after the condensation reaction between such phenol compound and a corresponding half molar quantity of phosgene in the first stage, can be represented by the following equation:

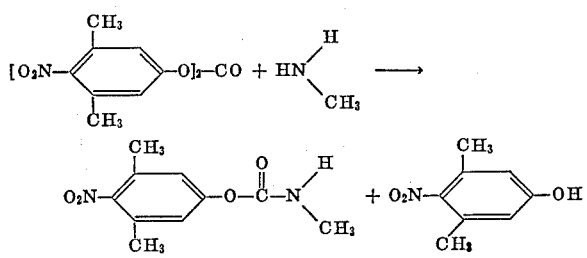

During the first stage, the nitrophenol is of course reacted with an approximately half molar quantity of phosgene. If desired, it is convenient to carry out this operation in the presence of an inert solvent. A base, preferably an alkali metal hydroxide, e.g. sodium, potassium or lithium hydroxide, is added in order to neutralize the hydrochloric acid formed. The pH value is maintained preferably at substantially about 8. The temperatures may again be varied within a fairly wide range but preferably is substantially between about 20 and 60° C.

The bis-nitrophenyl carbonate formed during the first stage is reacted with the amine. It is convenient, if desired, to carry out this operation without the use of a solvent. The most favorable reaction temperatures are substantially between about −10 and +20° C.

The nitro-alkyl-phenols used as the starting materials, in accordance with the present invention, some of which are new, can be obtained by the nitration of the corresponding phenols and subsequent separation of the o-isomers by steam distillation.

The compounds according to the present invention have a low toxicity toward warm-blooded animals and fish but, nevertheless, exhibit strong molluscicidal properties and are, therefore, suitable for the control of gastropods such as land pulmonate gastropods (Styllommatophora) and water pulmonate snails (Basommatophora).

The land pulmonate gastropods (slugs and snails) mainly include the Zonitidae, such as *Oxychilus draparnaldi*; the Limacidae, such as *Deroceras reticulatum* and *Deroceras agreste*; the Arionidae, such as *Arion rufus*; the Endodontidae, such as *Goniodiscus rotundatus*; and the Helicidae, such as *Fruiticicola hispida, Theba pisana, Arianta arbustorum* and *Cepaea memoralis*.

The water pulmonate snails mainly comprise the Limnaeidae, such as *Limnaea truncatula*; and the Planorbidae, such as *Helisoma nigricans*.

The new compounds according to the present invention can be utilized, if desired, in the form of the usual formulations or compositions with dispersible carrier vehicles, such as emulsifiable concentrates, spray powders, pastes, soluble powders, dusting agents, etc., and especially seed dressing agents, fumigating agents, baits and the like. These are prepared in known manner, for example, by extending the active agents with solvents and/or solid carriers, optionally with the use of emulsifying agents and/or dispersing agents (cf. Agricultural Chemicals, March 1960, pages 35–38). The following can be chiefly considered as carrier vehicles or adjuvants for this purpose: solvents, such as aromatic hydrocarbons (for example, toluene, xylene or benzene, etc.), chlorinated aromatic hydrocarbons (for example, chlorobenzene), paraffins (for example, petroleum fractions), alcohols (for example, methanol, propanol or butanol, etc.), amines (for example, ethanolamine), dimethyl-formamide, and water; finely divided solid carriers, such as natural ground minerals (for example, kaolins, alumina, talc, $SiO_2$ and chalk) and synthetic ground minerals (for example, highly-dispersed silicic acid and silicates, e.g. alkali silicates, etc.); emulsifying agents, such as non-ionic and anionic emulsifying agents (for example, polyethylene oxide esters of fatty acids, polyethylene oxide ethers of fatty alcohols, alkyl sulfonates and aryl sulfonates, especially magnesium stearate, sodium oleate, etc.); and dispersing agents, such as lignin, spent sulphite liquors and methyl cellulose, as well as natural and synthetic attractant agents and baits, such as milled cereal products, bran, egg powder, ground dried blood, casein, dried yeast and ethereal oils.

The active compounds according to the present invention may also be present in the compositions in the form of mixtures with known molluscicidal agents, if desired, such as metaldehyde.

In general, the compositions or formulations contain substantially between about 0.1 and 95 percent by weight of the active agent, preferably substantially between about 0.5 and 90 percent and particularly between substantially about 0.5–10 percent, by weight.

The compounds according to the present invention, their compositions with carrier vehicles or other active agents, and their preparations in the form of particular dosages for specific application are used for spraying and dusting the soil and plants and they may also be applied in the form of granulates or as baits or used for fumigation, for example, in greenhouses. They can also be added to water in a suitable form, such as in the form of an emulsifiable concentrate, granulate or soluble powder, as for example for the control of water snails.

The following Examples are given for the purpose of illustration, and not limitation, of the present invention;

Example A 0.167 g. of a talc preparation containing 30% 4-nitro-3,5 - dimethyl - phenyl - N - methyl carbamate were mixed with 3.833 g. fine wheat bran. The concentration of the active agent thus amounted to 1.25%. This mixture was applied uniformly on the inner surfaces of a glass Petri dish of 15 cm. diameter which had been lined with moist filter papers.

Two red slugs (Arion rufus) were placed into this dish. Both of these were dead on the second day of the experiment. Untreated controls still lived after seven days, when the experiment was finished.

Example B

Two specimens of the slug Limax flavus were placed in a Petri dish prepared as in Example A; these died on the second day of the experiment whereas the untreated controls (see Example A) still lived after seven days.

Example C

A pulp was prepared from 55% fine wheat bran, 10% dried whole egg powder, 5% ground dried blood, 5% methyl cellulose, 10% casein, 10% dried yeast and 5% 4 - nitro - 3,5 - dimethyl - phenyl - N - methyl carbamate, with the addition of some water, and this dried again and then granulated. 2 g. of this granulated bait were spread uniformly on one-half of the floor area of a wire gauze box (dimensions 25 x 25 x 10 cm.) which had been covered with soil; the other half was left untreated. A young cabbage plant was placed in each corner of the box. Four fully grown specimens of the red slug (Arion rufus) were placed on the untreated side. Two of the slugs had died by the third day of the experiment and the other two slugs were dead on the fourth day. The cabbage plants remained unaffected. An untreated control group still lived after an observation period of seven days.

Example D

The whole area of an experimental box of the type described in Example C was dusted with 5 g. of a powder consisting of 5% 4 - nitro - 3,5 - dimethyl - phenyl - N-methyl carbamate and 95% finely-dispersed silicon dioxide. Four red slugs (Arion rufus) were again introduced and all of these died on the third or fourth day of the experiment. An untreated control group still lived after an observation period of seven days.

Example E 1 g. of a bait mixture consisting of 5% 4-nitro-3,5-dimethyl-phenyl-N-methyl carbamate, 94.5% fine wheat bran and 0.5% of a mould prevention product was placed on one-half of the floor area of an experimental box of type described in Example C. The other half was again left untreated and four red slugs (Arion rufus) were placed on it. One of the animals died on the second day, another on the third day and the last two on the fourth day of the experiment whereas the untreated controls (see Example C) survived for the full seven day observation period remaining healthy.

Example F 50 mg. 4-nitro-3,5-dimethyl-phenyl-N-methyl carbamate were dissolved, by warming, in 300 mg. of a polyoxyethylene glycol sulfonate, with the addition of 1 ml. acetone, and then diluted to 1 litre with aquarium water. 10 water pulmonate snails (Helisoma nigricans) were then introduced into this mixture containing 50 p.p.m. of the active agent. All the animals were dead after 3 hours.

Example G

The following Table 1 summarizes the results of seven day experiments carried out in accordance with Example E with the red slug Arion rufus to illustrate the improved activity of the new carbamates according to the present invention compared with those presently known. The carrier was the same as described in Example E.

TABLE 1

| Product | Concentration, in percent | Number of experimental specimens (Arion rufus) | Mortality, in percent | Time required for destruction, days |
|---|---|---|---|---|
| (1) 4-nitro-3,5-dimethyl-phenyl-N-methyl carbamate (Example E) | 5 | 4 | 100 | 2–4 |
| (2) 4-dimethylamino-3,5-dimethyl-phenyl-N-methyl carbamate (known) | 5 | 4 | 75 | 6–7 |
| (3) N-methyl-1-naphthyl carbamate (known) | 5 | 4 | 0 | |

Example H

Table 2 summarizes the results of a comparative seven day experiment carried out in accordance with Examples A and B on the cellar slugs (Limax flavus). The carrier was the same as described in Examples A and B.

TABLE 2

| Product | Concentration, in percent | Number of experimental specimens (Limax flavus) | Mortality, in percent | Time required for destruction, days |
|---|---|---|---|---|
| (1) 4-nitro-3,5-dimethyl-phenyl-N-methyl carbamate | 1.25 | 2 | 100 | 2–3 |
| (2) N-methyl-1-naphthyl carbamate (known) | 1.25 | 2 | 0 | |

Example I

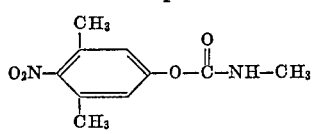

16.7 g. (0.1 mole) 3,5-dimethyl-4-nitro-phenol are dissolved in dioxan and reacted with 6.27 g. (0.11 mole) methyl isocyanate. The reaction mixture becomes slightly warm when 3 drops triethylamine have been added. It is heated at 45° C. for another 30 minutes and left to stand overnight, in order to complete the reaction. The solvent is distilled off in vacuo, a honey-colored oil remaining which crystallizes completely on trituration. When recrystallized from alcohol, 3,5-dimethyl-4-nitrophenyl-N-methyl carbamate is obtained with a melting point of 111° C.

3 - methyl-5-ethyl-4-nitrophenyl-N-methyl carbamate, 3-isopropyl - 4 - nitrophenyl-N-methyl carbamate, and 3,5-dimethyl - 2 - nitrophenyl-N-methyl carbamate, can be prepared according to the same method, as well as other analogous products:

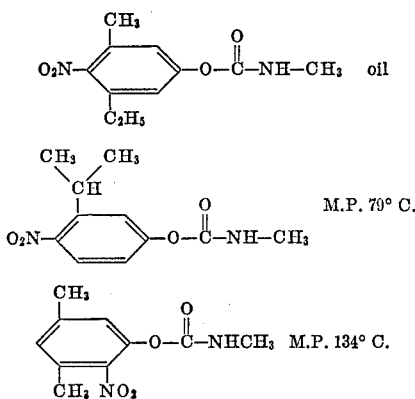

Example II

Example I may be repeated under substantially the same conditions starting with other alkyl isocyanates, such as methyl-, ethyl-, isopropyl-, and butyl-, isocyanates, respectively and appropriate nitrophenols such as 3,5-dimethyl - 4 - nitrophenol, 3,5-dimethyl-2-nitrophenol, 3-isopropyl - 4 - nitrophenol, 3 - methyl-5-ethyl-4-nitrophenol, 3-ethyl - 5 - n-propyl-4-nitrophenol, 3-n-butyl-5-isobutyl-2,4-dinitrophenol, and 3-propyl - 2 - nitrophenol, respectively, whereby corresponding carbamic acid esters are obtained, all of which possess the desired molluscicidal activity, especially in dosage concentrations of substantially between about 1.25 to 5%.

Preferably, R in the foregoing formulae represents lower alkyl, such as $C_1$-$C_4$ lower alkyl inclusive, and particularly a member selected from the group consisting of methyl, ethyl, n-propyl, isopropyl, n-butyl, isobutyl, sec.-butyl, and tert.-butyl, etc.; R' in the foregoing formulae represents hydrogen or R as defined immediately hereinabove; R" in the foregoing formulae represents R as defined immediately hereinabove; R''' in the foregoing formulae represents hydrogen; and one A in the foregoing formulae represents hydrogen and the other A in the foregoing formulae represents $NO_2$.

Thus, such compounds include the following types:

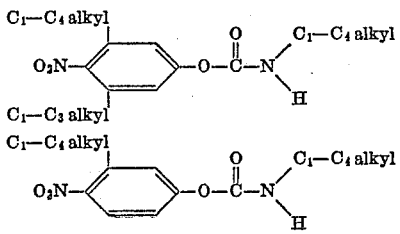

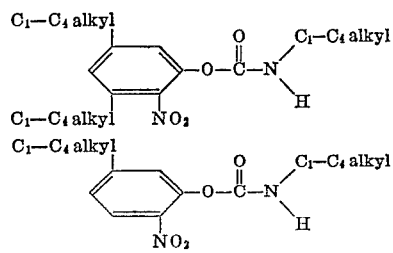

It will be appreciated that the instant specification and examples are set forth by way of illustration and not limitation, and that various modifications and changes may be made without departing from the spirit and scope of the present invention.

What is claimed is:

1. Method of controlling molluscs which comprises applying to the molluscs and their habitat a molluscicidally effective amount of a nitrophenyl carbamic acid ester of the formula

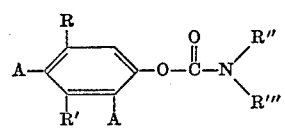

in which R is a lower alkyl radical having 1–5 carbon atoms, R' and R''' each is selected from the group consisting of hydrogen and a lower alkyl radical having 1–5 carbon atoms, R" is selected from the group consisting of a lower alkyl radical having 1–5 carbon atoms, and a phenyl radical, and each A is selected from the group consisting of hydrogen and a nitro group, at least one such A being a nitro group.

2. Method according to claim 1 wherein said ester is used in a concentration of between substantially about 0.5–10% in a dispersible carrier vehicle selected from the group consisting of solvents; finely divided solids; mixtures of solvents with a member selected from the group consisting of non-ionic and anionic emulsifying agents dispersing agents, and mixtures of such agents; mixtures of solvents with a member selected from the group consisting of natural and synthetic attractant agents and baits; and mixtures of finely divided solids with a member selected from the group consisting of natural and synthetic attractant agents and baits.

3. Method according to claim 1 wherein R is a lower alkyl radical having 1–5 carbon atoms, R' is hydrogen, R" is a lower alkyl radical having 1–5 carbon atoms, R''' is hydrogen, and one A is hydrogen and the other A is a nitro group.

4. Method according to claim 1 wherein R is a lower alkyl radical having 1–5 carbon atoms, R' is a lower alkyl radical having 1–5 carbon atoms, R" is a lower alkyl radical having 1–5 carbon atoms, R''' is hydrogen, and one A is hydrogen and the other A is a nitro group.

5. Method according to claim 1 wherein said ester has the formula

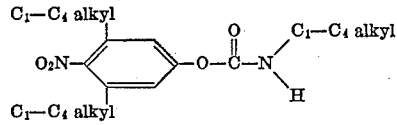

6. Method according to claim 1 wherein said ester has the formula

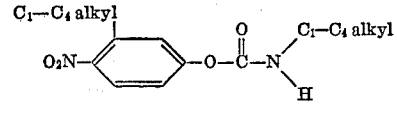

7. Method according to claim 1 wherein said ester has the formula

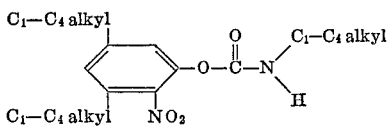

8. Method according to claim 1 wherein said ester has the formula

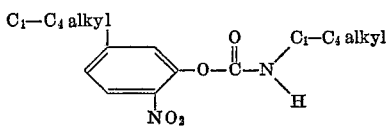

9. Method of controlling molluscs which comprises applying to the molluscs and their habitat a molluscicidally effective amount of 3,5-dimethyl-4-nitrophenyl-N-methyl carbamate of the formula

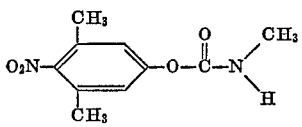

10. Method of controlling molluscs which comprises applying to the molluscs and their habitat a molluscicidally effective amount of 3-methyl-5-ethyl-4-nitrophenyl-N-methyl carbamate of the formula

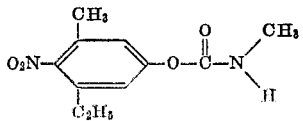

11. Method of controlling molluscs which comprises applying to the molluscs and their habitat a molluscicidally effective amount of 3-isopropyl-4-nitrophenyl-N-methyl carbamate of the formula

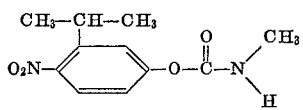

12. Method of controlling molluscs which comprises applying to the molluscs and their habitat a molluscicidally effective amount of 3,5-dimethyl-2-nitrophenyl-N-methyl carbamate of the formula

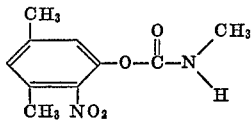

References Cited

UNITED STATES PATENTS 2,933,383   4/1960   Lambrech.
3,265,567   8/1966   Rice et al. _____ 167—38.6

FOREIGN PATENTS 128,292   5/1950   Sweden.
554,576   3/1958   Canada.
1,139,113   11/1962   Germany.

OTHER REFERENCES

Kolbezen et al., Journal of Agricultural & Food Chemistry, vol. 2, pp. 864–870, 1954.

FRANK CACCIAPAGLIA, JR., Primary Examiner
VINCENT D. TURNER, Assistant Examiner

U.S. Cl. X.R.

71—106; 260—471, 482

PO-1050
(5/69)

UNITED STATES PATENT OFFICE
CERTIFICATE OF CORRECTION

Patent No. 3,458,639          Dated July 29, 1969

Inventor(s) Rudolf Heiss, Ernst Grigat, Ernst Bocker and Gunther Hermann

It is certified that error appears in the above-identified patent and that said Letters Patent are hereby corrected as shown below:

Column 7, line 70, in the structural formula "$C_1-C_3$" should read --$C_1-C_4$--

SIGNED AND
SEALED
DEC 23 1969

(SEAL)
Attest:

Edward M. Fletcher, Jr.
Attesting Officer

WILLIAM E. SCHUYLER, JR.
Commissioner of Patents